2 Sheets—Sheet 1.

J. J. WHITE.
Chain-Making Machine.

No. 200,677. Patented Feb. 26, 1878.

Witnesses:
Lewis F. Bross?
A. P. Grant

Inventor:
Joseph J. White
by John A. Wiedersheim
Attorney.

2 Sheets—Sheet 2.
J. J. WHITE.
Chain-Making Machine.
No. 200,677. Patented Feb. 26, 1878.
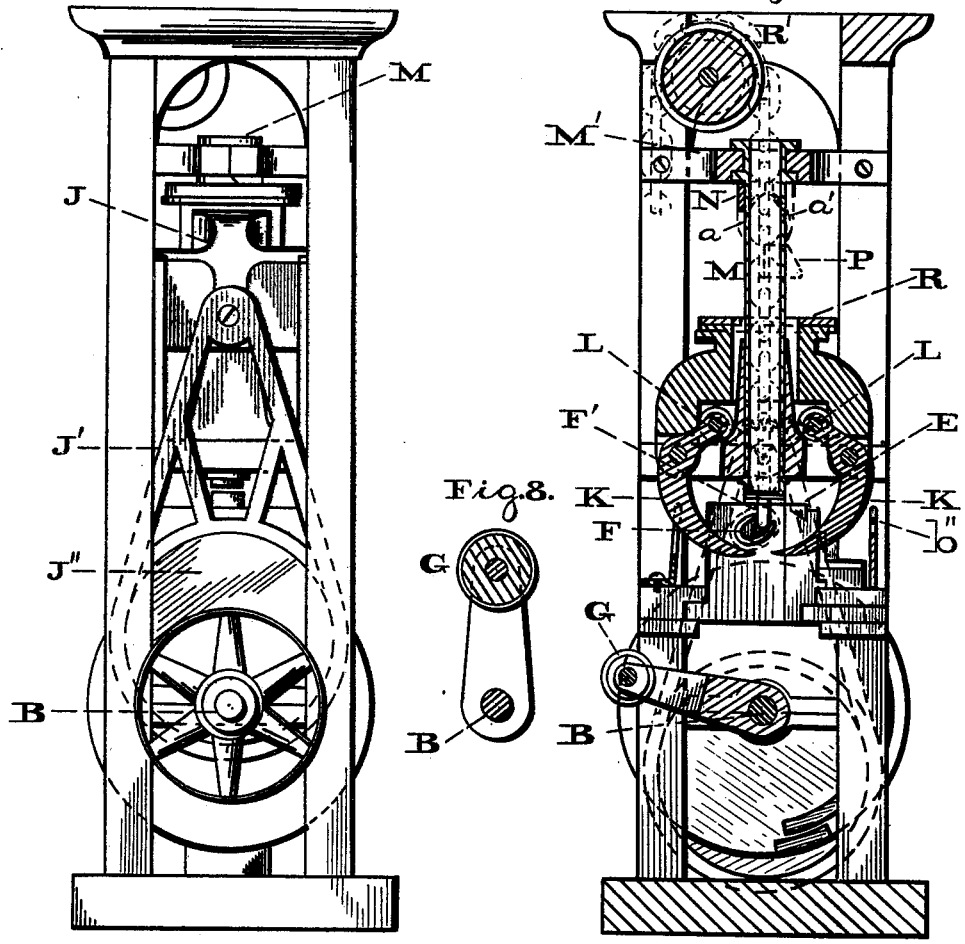
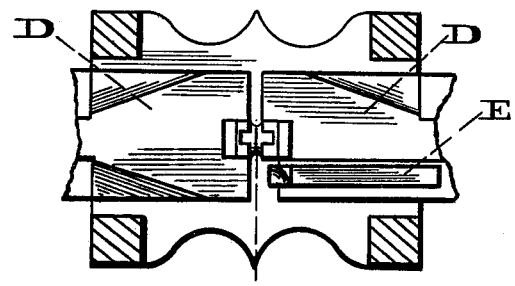
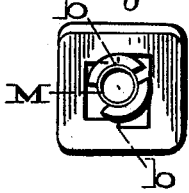
Witnesses:
Lewis F. Brous
A. P. Grant
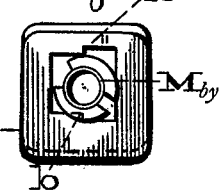
Inventor:
Joseph J. White
by John A. Wiedersheim
Attorney.
N. PETERS, PHOTO-LITHOGRAPHER, WASHINGTON, D. C.

UNITED STATES PATENT OFFICE.

JOSEPH J. WHITE, OF SMITHVILLE, NEW JERSEY.

IMPROVEMENT IN CHAIN-MAKING MACHINES.

Specification forming part of Letters Patent No. 200,677, dated February 26, 1878; application filed April 11, 1877.

*To all whom it may concern:*

Be it known that I, JOSEPH J. WHITE, of Smithville, in the county of Burlington and State of New Jersey, have invented a new and useful Improvement in Chain-Making Machines, which improvement is fully set forth in the following specification and accompanying drawings, in which—

Figure 1:
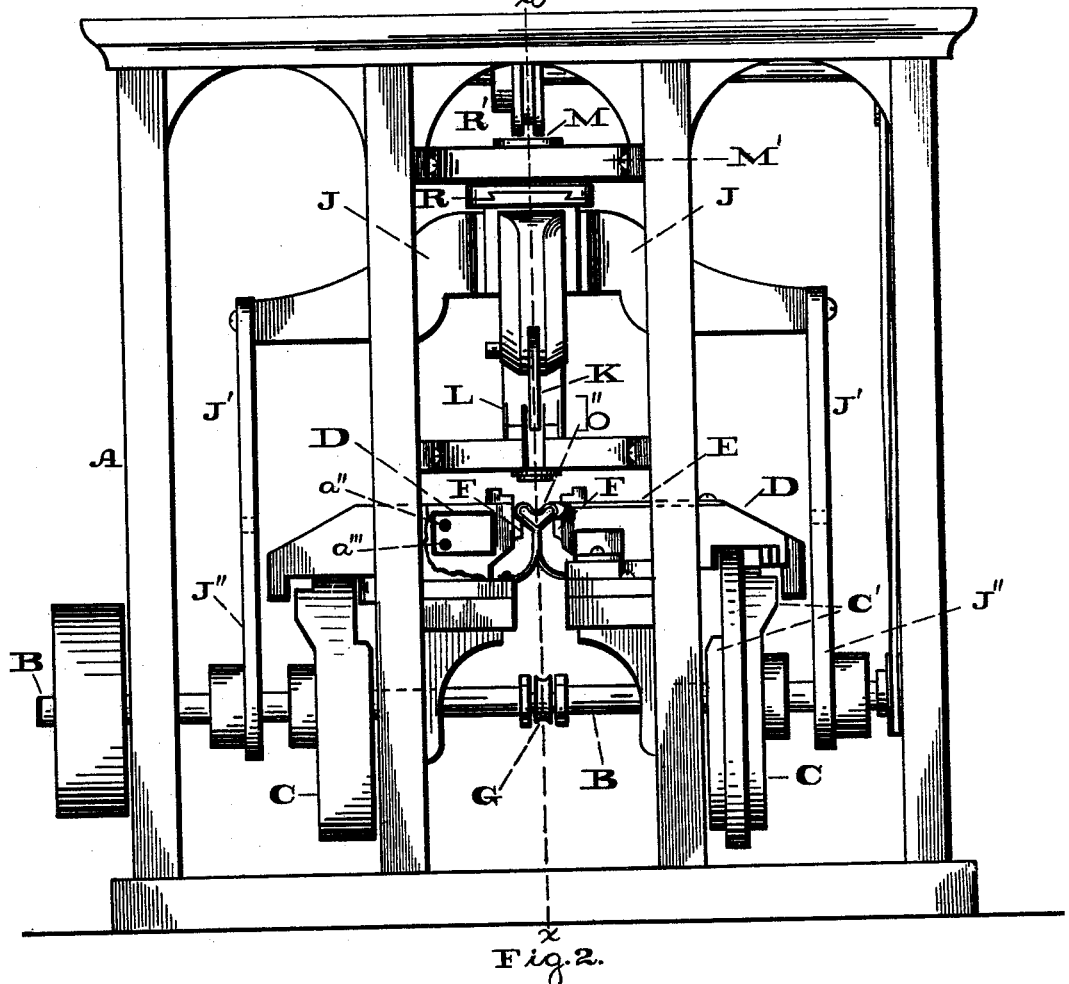
Figure 2:
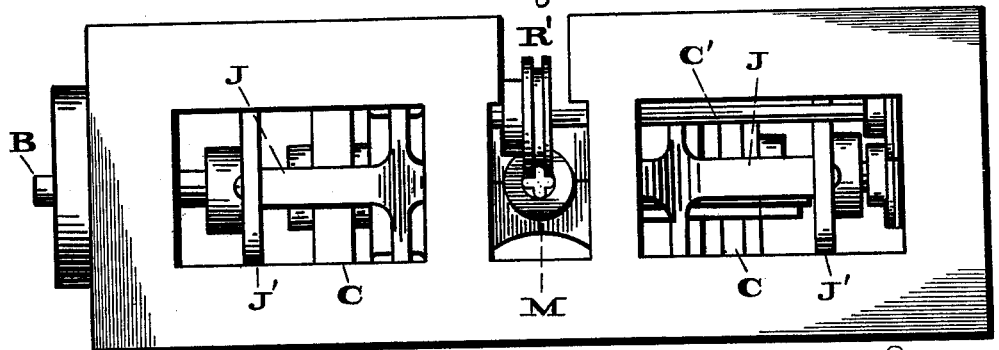

Figure 1 is a front view of the machine embodying my invention. Fig. 2 is a top or plan view thereof. Fig. 3 is a side view thereof. Fig. 4 is a central vertical section in line $x\ x$, Fig. 1. Fig. 5 is a top view of a portion of the heads. Figs. 6 and 7 are top views of the tube which rotates the chain and mechanism for effecting the rotation. Fig. 8 is a section of the welding-roller.

Similar letters of reference indicate corresponding parts in the several figures.

My invention relates to improvements in the class of chain-making machines which perform the entire operation of making chain when fed with a straight rod at welding-heat.

The invention consists in a machine for forming chains in which mechanisms are provided for cutting blanks from a rod, bending them around a mandrel, which is bisected and the halves arranged on approaching and receding heads, welding the ends of the links together, and also for connecting the links into a continuous chain.

Referring to the drawings, A represents a frame or support for the working parts of the machine. B represents the main or driving shaft, which is mounted on the frame A, and carries cams C C, which engage with heads D, mounted so as to admit of a reciprocating movement, and advancing to and receding from each other from side to side of the frame A by the action of the cams C. E represents a horizontally-arranged chisel or cutter, having its cutting-edge set diagonally, and which is secured to a reciprocating head mounted adjacent to one of the heads D on the side where the metal rod is to be fed to the machine, the bed of the chisel or cutter being preferably the contiguous portion of the opposite head, the chisel or cutter receiving motions to and from the bed by means of one of the faces C′ of the adjacent cams C.

On the opposed or inner faces of the heads D is a bisected mandrel, F, whose contour is somewhat that of the link to be formed, the long sides standing diagonal or horizontal, and beneath said mandrel is a welding-roller, G, which will be mounted on arms secured to the main shaft B, and have a rotary motion toward the mandrel.

On the frame A, above the heads D, there is mounted a vertically-moving cross-head, J, to whose sides are pivoted yokes J′, operated by eccentrics J″ secured to the main shaft B, whereby said head will be caused to ascend and descend.

To the sides of the central portion of the cross-head there are pivoted fingers K, whose lower ends project below said portion, and their upper portions are in contact with the cam-faces of a vertically-extending boss, L, which is secured to the center of the frame A above the heads D, the central tubular portion of the cross-head surrounding said boss.

M represents a rotating tube, which is suspended from a cross-head or support, M′, at the upper part of the frame A, and it passes through the boss L, so that its lower end is just above the mandrel F when the heads are closed, the opening of the tube near the lower end being cross-shaped.

On the outer surface of the tube M, near the upper end thereof, there are formed or secured a cam, N, with two spiral faces, $a\ a'$, and a lug or cam, P, (see Fig. 4,) said cams being adapted to engage with a sliding table, R, which consists of a frame jointed to the upper face of the central portion of the cross-head J, and formed with shoulders $b\ b'$ on opposite inner faces.

Above the tube M is mounted a feed-roller or pulley, R′, for raising the chain as produced, and passing it from the machine.

The operation is as follows: Power will be applied to the main shaft in any suitable manner. The rod will be heated in a proper furnace, and then thrust in between the heads D over the mandrel F, the rod being guided and supported on a standard, b″, which is secured to the frame A in front of the center of the heads. The heads and mandrel now close, and immediately the chisel or cutter E moves forward and cuts off from the rod a piece of sufficient length to make one link, the cut edges of the piece being scarfed, and the piece resting on the upper outer face of the mandrel and supported between the heads. The cross-head J then descends and lowers the fingers K against the cut rod, and said fingers, owing to their contact with the cam-faces of the boss L, are then forced toward each other, whereby the piece of rod will be bent around the bisected mandrel F, and assume the shape thereof, the scarfed ends of the piece of rod approaching on the lower side of the mandrel F. The fingers then rise, and the roller G now advances and welds the ends of the rod, thus closing the link, the weld being on the side of the link. The heads now separate, so that the bisected mandrel recedes from and clears the formed link, and the welding-roller descends. The link as formed may be hooked to a chain extending through the tube M and over the pulley R', or otherwise attached, in order to be raised through the rotating tube M, care being taken that the link is presented vertically to one limb of the cross-shaped opening of the tube, so as to stand at a right angle to the direction in which it rested while being formed, and it is suspended between a bisected channel, F' which is formed on the opposed faces of the heads and projects into the space of the bisected mandrel F.

It will here be noticed that the shape of the mandrel is such that the link will be somewhat wider than the limb of the cross-shaped opening of the tube, so that it will resist the upward tension of the chain and lodge at the proper height for receiving the next link. When the heads again close, the link inclosed by the bisected swaging-channel F' will be compressed into proper shape, and thus permitted to enter the bottom opening of the tube. Prior to this, however, another length of rod is fed, and it enters or is threaded on the suspended link. The length or piece is then cut, bent and welded, and released; but the link thus produced hangs in such position that the next threading or projection of another length of the rod into the last link cannot be accomplished.

For this purpose it is essential to rotate the chain as formed. As the cross-head J rises, one thread, $a$, of the cam N comes in contact with the adjacent shoulder $b$ of the sliding table R, whereby rotation is imparted to the tube, and consequently to the chain. Then the threading, bending, and welding are repeated. When the cross-head again rises the cam P on the tube comes in contact with the table, so as to shift it to the opposite side, whereby the other thread, $a'$, of the cam N is brought in contact with the opposite shoulder $b'$ of the table. Consequently the tube rotates in reversed order. This reciprocation of the tube continually presents the last link formed at a right angle to the thrust of the length of rod to produce the new link, whereby the threading will be properly accomplished as the chain progresses, each link being alternately presented to the limbs of the cross-shaped opening of the tube.

Owing to the projection of the bisected swaging-channel F' into the bisected mandrel F, the lower portion of the link last formed will fill said space, so that the new length of rod may be introduced into said link, and the latter may not obstruct the surface of the mandrel, whereby the bending of the length around the mandrel may be properly accomplished.

The chain passes from the tube M over the pulley R', which is rotated by suitable mechanism, the friction thus produced imparting a tension to the chain.

In order to keep the bisected mandrel cool, I form each portion hollow, and attach thereto an induction-pipe, $a''$, and eduction-pipe $a'''$, whereby a stream of cool or cold water may be constantly admitted into the anvils, the warm water passing out through the pipe $a'''$.

Having thus described my invention, what I claim as new, and desire to secure by Letters Patent, is—

1. In a chain-making machine, a welding-roller, G, in combination with a bisected mandrel, F, the halves of which are fixed upon heads caused to approach and recede from one another, substantially as and for the purpose described.

2. The tube M, provided with the cam N, having spiral faces $a\ a'$, and the cam P, in combination with the sliding table R, having shoulders $b\ b'$, substantially as and for the purpose described.

JOSEPH J. WHITE.

Witnesses:
JOHN A. WIEDERSHEIM,
A. P. GRANT.